(12) United States Patent
Beswick et al.

(10) Patent No.: US 9,546,680 B2
(45) Date of Patent: Jan. 17, 2017

(54) BEARING COMPONENT

(71) Applicants: John Beswick, Montfoort (NL);
Mohamed Sherif, Hilversum (NL)

(72) Inventors: John Beswick, Montfoort (NL);
Mohamed Sherif, Hilversum (NL)

(73) Assignee: AKTIEBOLAGET SKF, Gothenburg (SE)

( * ) Notice: Subject to any disclaimer, the term of this patent is extended or adjusted under 35 U.S.C. 154(b) by 284 days.

(21) Appl. No.: 14/354,749

(22) PCT Filed: Oct. 26, 2012

(86) PCT No.: PCT/EP2012/071316
§ 371 (c)(1),
(2) Date: Apr. 28, 2014

(87) PCT Pub. No.: WO2013/060878
PCT Pub. Date: May 2, 2013

(65) Prior Publication Data
US 2015/0023623 A1 Jan. 22, 2015

(30) Foreign Application Priority Data

Oct. 28, 2011 (WO) ................. PCT/EP2011/069063

(51) Int. Cl.
| | |
|---|---|
| *F16C 33/34* | (2006.01) |
| *C21D 9/40* | (2006.01) |
| *C22C 38/02* | (2006.01) |
| *C22C 38/24* | (2006.01) |
| *C22C 38/30* | (2006.01) |
| *F16C 33/62* | (2006.01) |
| *C21D 1/20* | (2006.01) |

(Continued)

(52) U.S. Cl.
CPC ............. *F16C 33/34* (2013.01); *B22F 5/106* (2013.01); *C21D 1/20* (2013.01); *C21D 9/40* (2013.01); *C22C 33/0278* (2013.01); *C22C 37/06* (2013.01); *C22C 37/10* (2013.01); *C22C 38/02* (2013.01); *C22C 38/24* (2013.01); *C22C 38/30* (2013.01); *C22C 38/36* (2013.01); *C22C 38/38* (2013.01); *F16C 33/32* (2013.01); *F16C 33/62* (2013.01); *C21D 2211/002* (2013.01); *C21D 2211/004* (2013.01); *C21D 2211/008* (2013.01)

(58) Field of Classification Search
CPC ..... C22C 37/06; F16C 33/34; C21D 2211/002
See application file for complete search history.

(56) References Cited

U.S. PATENT DOCUMENTS 5,560,787 A * 10/1996 Takagi ..................... C21D 9/36
148/319
2005/0236072 A1* 10/2005 Takayama ............... C22C 38/02
148/334

FOREIGN PATENT DOCUMENTS

| GB | 1364235 A | * 8/1974 | ............. B22D 13/02 |
|---|---|---|---|
| JP | 3219047 A | 9/1991 | |

(Continued)

*Primary Examiner* — Jessee Roe
*Assistant Examiner* — Christopher Kessler
(74) *Attorney, Agent, or Firm* — Bryan Peckjian; SKF USA Inc. Patent Dept.

(57) ABSTRACT

A bearing component formed from a steel composition and providing carbon, silicon, manganese, chromium, cobalt, vanadium, and at least one of the following elements sulphur, phosphorous, molybdenum, aluminum, arsenic, tin, antimony, and the balance iron, together with impurities.

20 Claims, 4 Drawing Sheets

(51) Int. Cl.
*C22C 38/36* (2006.01)
*C22C 38/38* (2006.01)
*B22F 5/10* (2006.01)
*C22C 33/02* (2006.01)
*C22C 37/06* (2006.01)
*C22C 37/10* (2006.01)
*F16C 33/32* (2006.01)

(56) References Cited

FOREIGN PATENT DOCUMENTS

| | | | |
|---|---|---|---|
| JP | 3254340 | A | 11/1991 |
| JP | 7252595 | A | 10/1995 |
| WO | 0179568 | A1 | 10/2001 |

\* cited by examiner

BEARING COMPONENT

CROSS-REFERENCE

This application is the U.S. national stage of International Application No. PCT/EP2012/071316 filed on Oct. 26, 2012, which claims priority to International Application PCT/EP2011/069063 filed Oct. 28, 2011.

TECHNICAL FIELD

The present invention relates generally to the field of metallurgy and to a bearing component such as a rolling element or ring formed from a bearing steel. The bearing steel has a microstructure that typically comprises vanadium carbide precipitates dispersed in a matrix of very fine bainite and/or tempered martensite.

BACKGROUND

Bearings are devices that permit constrained relative motion between two parts. Rolling element bearings comprise inner and outer raceways and a plurality of rolling elements (balls or rollers) disposed therebetween. For long-term reliability and performance it is important that the various elements have a high resistance to rolling contact fatigue, wear and change in dimensions.

Conventional techniques for manufacturing metal components involve hot-rolling or hot-forging to form a bar, rod, tube or ring, followed by a soft forming process to obtain the desired component. Surface hardening processes are well known and are used to locally increase the hardness of surfaces of finished or semi-finished components so as to improve, for example, wear resistance and fatigue resistance. A number of surface or case hardening processes are known for improving rolling contact fatigue performance.

An alternative to case-hardening is through-hardening. Through-hardened components differ from case-hardened components in that the hardness is uniform or substantially uniform throughout the component. Through-hardened components are also generally cheaper to manufacture than case-hardened components because they avoid the complex heat-treatments associated with carburizing, for example.

For through-hardened bearing steel components, two heat-treating methods are available: martensite hardening or austempering. Component properties such as toughness, hardness, microstructure, retained austenite content, and dimensional stability are associated with or affected by the particular type of heat treatment employed.

The martensite through-hardening process involves austenitising the steel prior to quenching below the martensite start temperature. The steel may then be low-temperature tempered to stabilize the microstructure.

The bainite through-hardening process involves austenitising the steel prior to quenching above the martensite start temperature. Following quenching, an isothermal bainite transformation is performed. Bainite through-hardening is sometimes preferred in steels instead of martensite through-hardening. This is because a bainitic structure may possess superior mechanical properties, for example toughness and crack propagation resistance.

Numerous conventional heat-treatments are known for achieving martensite through-hardening and bainite through-hardening.

WO 01/79568 describes a method for the production of a part for a rolling bearing.

SUMMARY

The present invention provides a bearing component formed from a steel alloy comprising:
(a) from 1.8-2.8 wt. % carbon,
(b) from 1.0-2.0 wt. % silicon,
(c) from 1.0-2.5 wt. % manganese,
(d) from 1.0-2.5 wt. % chromium,
(e) from 1.0-2.0 wt. % cobalt,
(f) from 5.0-11.0 wt. % vanadium,
(g) optionally one or more of the following elements
   from 0-0.1 wt. % sulphur,
   from 0-0.1 wt. % phosphorous,
   from 0-1.35 wt. % molybdenum,
   from 0-0.5 wt. % aluminium,
   from 0-0.075 wt. % arsenic,
   from 0-0.075 wt. % tin,
   from 0-0.015 wt. % nitrogen,
   from 0-0.075 wt. % antimony, and
(h) the balance iron, together with unavoidable impurities.

The bearing component is formed from the alloy as herein described and preferably via a powder metallurgy route.

The microstructure of the steel alloy preferably comprises lower bainite as the main phase (typically at least 60% bainite, more typically at least 80% bainite). The plates of bainite are very fine. In particular, the material preferably has a microstructure comprising plates of bainite (preferably lower bainite) of less than 100 nm thickness, typically from 10 to 50 nm, more typically from 20 to 40 nm. The plates of bainite are advantageously interspersed with retained austenite thin films. The bainite typically forms at least 60% of the microstructure, more typically at least 80% (by volume).

Alternatively, the microstructure may comprise tempered martensite as the main phase. In this case, typically the microstructure comprises at least 60 vol. % martensite, more typically at least 80 vol. % martensite.

The microstructure may comprise both bainite (preferably lower bainite) and martensite.

The steel preferably also contains vanadium carbide precipitates and/or vanadium carbonitride precipitates.

Additionally, the steel may also contain $M_7C_3$ and/or $M_3C$ carbides. Typically, the microstructure will comprise at least 3% carbides, more typically at least 25% (by volume).

The microstructure and resulting mechanical properties lead to improved rolling contact fatigue performance in the bearing component.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The steel alloy preferably comprises from 1.9-2.7 wt. % carbon, more preferably from 2.1 to 2.6 wt. % carbon, still more preferably from 2.2 to 2.5 wt. % carbon. In combination with the other alloying elements, this results in the desired fine (lower) bainite microstructure. Carbon acts to lower the bainite start transformation temperature. Carbon also forms desirable carbide precipitates with vanadium, which improves the mechanical properties.

The steel alloy preferably comprises 1.2-1.8 wt. % silicon, more preferably from 1.3-1.7 wt. % silicon, still more preferably from 1.4-1.6 wt. % silicon. In combination with the other alloying elements, this results in the desired microstructure. Silicon helps to suppress the precipitation of cementite. However, too high a silicon content may result in undesirable surface oxides and a poor surface finish. For this reason, the maximum silicon content is 2 wt. %, more preferably 1.9 wt. %.

The steel alloy preferably comprises from 1.2-2.3 wt. % manganese, more preferably from 1.3-2.1 wt. % manganese, still more preferably from 1.6-1.8 wt. % manganese. Manganese acts to increase the stability of austenite relative to ferrite. Manganese may also increase the hardenability.

The steel alloy preferably comprises from 1.2-2.3 wt. % chromium, more preferably from 1.3-2.1 wt. % chromium, still more preferably from 1.6-1.8 wt. % chromium. Chromium acts to increase hardenability and reduce the bainite start temperature.

The steel alloy preferably comprises from 1.1-1.8 wt. % cobalt, more preferably from 1.2-1.6 wt. % cobalt, still more preferably 1.3-1.5 wt. % cobalt. Cobalt has been found to improve the corrosion resistance of the bearing component. This is very important for bearing components for wind turbines or marine pods, for example. Such bearings may become contaminated by sea water, which can drastically reduce the service life of the bearing. Cobalt also acts to accelerate the transformation to bainite. However, too much cobalt (in excess of 2.0 wt. %) in conjunction with the other alloy elements herein described may result in too high an austenitising temperature, i.e. above 1150° C.

The steel alloy preferably comprises from 6.0-10.0 wt. % vanadium, more preferably from 6.5-9.0 wt. % vanadium, still more preferably 7.0-8.0 wt. % vanadium. Vanadium combines with carbon to form vanadium carbide precipitates. The vanadium carbide precipitates increase the yield strength, tensile strength and/or hardness of the material. Vanadium carbonitride precipitates may also be present.

The steel alloy may optionally include one or more of the following elements
from 0-0.1 wt. % sulphur,
from 0-0.1 wt. % phosphorous,
from 0-1.35 wt. % molybdenum,
from 0-0.5 wt. % aluminium,
from 0-0.075 wt. % arsenic,
from 0-0.075 wt. % tin,
from 0-0.015 wt. % nitrogen, and
from 0-0.075 wt. % antimony.

The steel alloy preferably comprises little or no sulphur, for example from 0-0.015 wt. % sulphur.

The steel alloy preferably comprises little or no phosphorous, for example from 0-0.02 wt. % phosphorous.

The steel alloy may optionally contain some molybdenum, for example from 0.25-0.5 wt. % molybdenum. Suitably, the steel alloy comprises no more than 1.35 wt. % molybdenum. Molybdenum acts to avoid austenite grain boundary embrittlement owing to impurities such as, for example, phosphorus. Molybdenum also acts to increase hardenability and reduce the bainite start temperature.

The steel alloy may optionally contain some aluminium, for example from 0.05-0.4 wt. % aluminium. Aluminium has been found to improve the intrinsic toughness of a hardened bearing component according to the invention, possibly due to it suppressing carbide formation. Aluminium also accelerates the transformation to bainite. In an alternative aspect, the steel composition contains little or no aluminium, preferably ≤0.05 wt. %. The inventor has found that the presence of aluminium is not conducive to processing via a powder metallurgical route.

The sum of arsenic, tin and antimony is preferably no more than 0.075 wt. %.

The steel alloy preferably comprises ≤15 ppm oxygen. Oxygen may be present as an impurity.

The steel alloy preferably comprises ≤30 ppm titanium. Titanium may be present as an impurity.

The steel alloy preferably comprises ≤50 ppm calcium. Calcium may be present as an impurity but may also be added intentionally in very small amounts.

The steel alloy may also contain very small amounts of nitrogen up to 0.015 wt. %.

The nitrogen, if present, combines with vanadium where the resulting phase is relatively more stable and helps in preventing excessive austenite grain growth when austenitising at high temperatures.

The steel alloy as described herein may consist essentially of the recited elements. It will therefore be appreciated that in addition to those elements which are mandatory other non-specified elements may be present in the composition provided that the essential characteristics of the composition are not materially affected by their presence.

The steel alloy may be manufactured by the following method: Firstly, the liquid steel composition is atomised. The resulting steel powder is then canned, sealed and HIPed (Hot Isostatic Pressing) at the appropriate pressure and temperature conditions, for the required period of time. The method further comprises a step of slow cooling. In one example, slow cooling is performed after the step of hot isostatic pressing. In another example, the method further comprises a step of hot working, which is performed after hot isostatic pressing. The step of slow-cooling is then performed after the step of hot working. Suitably, the method further comprises a step of stress-relief, which may be performed after the step of slow cooling.

The above manufacturing method results in the vanadium being dissolved, at least partly, in the austenite phase. The step of slow cooling precipitates out vanadium carbide and possibly also vanadium carbonitride, while the austenite mostly transforms to pearlite.

Alternatively, the steel alloy may be manufactured by regular ingot casting.

A bearing component that is made from the steel alloy composition is then subjected to a hardening treatment. The hardening treatment comprises a step of austenitising to a temperature of less than 1150° C., which results in austenite being formed together with retained vanadium carbide precipitates (and possibly also vanadium carbonitride precipitates). It is important to control the austenitisation temperature, to retain the vanadium precipitates and to prevent them from coarsening, and to avoid excessive growth of the austenite grains. The steel component may then undergo austempering/bainite through-hardening to transform the austenite to bainite (lower bainite).

The microstructure of the steel alloy preferably comprises a very fine bainitic matrix and vanadium carbide precipitates. In particular, the material preferably has a microstructure comprising plates of bainite (preferably lower bainite) of less than 100 nm thickness, typically from 10 to 50 nm, more typically from 20 to 40 nm. The plates of bainite are advantageously interspersed with retained austenite thin films. In addition to the vanadium carbide precipitates, vanadium carbonitride precipitates may also be present.

Alternatively, the steel alloy may undergo martensitic through-hardening instead of austempering/bainitic through-hardening in order to transform the austenite to martensite. Then, the structure is typically tempered at temperatures above the martensite-start temperature for the required time. Afterwards, the structure is allowed to cool to room temperature. The structure may be single, double or triple tempered. In between the tempering processes, the structure may be rinsed with cold water, or refrigerated, sometimes to sub-zero temperatures. The objective of these treatments is to reduce the retained austenite, thereby yielding better dimensional stability, strength and hardness. In this case, the microstructure of the steel composition may comprise a martensitic matrix and vanadium carbide precipitates. In addition to the vanadium carbide precipitates, vanadium carbonitride precipitates may also be present.

The microstructure of the steel may comprise bainite and/or martensite. Steels comprising martensite as the main phase may be particularly suitable for forming small to medium sized bearing rings and rollers. Steels comprising bainite as the main phase may be particularly suitable for forming medium to large sized bearing rings and rollers.

It will be appreciated that the steel for use in the bearing component according to the present invention may contain unavoidable impurities, although, in total, these are unlikely to exceed 0.5 wt. % of the composition. Preferably, the alloys contain unavoidable impurities in an amount of not more than 0.3 wt. % of the composition, more preferably not more than 0.1 wt. % of the composition. The phosphorous and sulphur contents are preferably kept to a minimum.

The alloys according to the present invention may consist essentially of the recited elements. It will therefore be appreciated that in addition to those elements which are mandatory other non-specified elements may be present in the composition provided that the essential characteristics of the composition are not materially affected by their presence.

The bearing component according to the present invention is formed from a steel that may transform to bainite at a temperature of typically 110 to 350° C., more typically 115 to 250° C. The transformation time for bainite formation to cease is typically from 3 hours to 80 days, more typically from 6 hours to 60 days. The transformation time depends on the transformation temperature: the time is longer for lower temperatures. The amount of bainite that is formed depends on the transformation temperature: more bainite is formed at lower temperatures. The amount of retained austenite increases for higher transformation temperatures.

The microstructure of the as-transformed (bainitically heat treated) steel is different from ordinary bainitic bearing steel structures in two respects. First, the presence of vanadium carbides (and/or vanadium carbonitrides) increases the yield strength and hardness of the bearing material. Second, during partial austenitisation, while taking into account the proportion of alloying elements lost to the precipitates, the matrix austenitic phase has a chemical composition which still allows it to subsequently transform into very fine nano-structured bainite (preferably lower bainite) upon isothermal holding at the appropriate temperature.

The microstructure of the as-transformed (martensitically heat treated) steel is different from ordinary tempered martensitic bearing steel structures in two respects. Firstly, due to the adoption of the powder metallurgy process route, for the given alloy composition, the hardened structure comprises numerous sub-micron sized vanadium-rich precipitates. Consequently, the hardness and strength of the structure is high, with the associated improvement of the load carrying capacity. Secondly, given the very high stability of the vanadium-rich precipitates, the structure holds its hardness and strength quite well at relatively high temperatures. That allows for the application of the present steel composition/heat treatment combination in the manufacture of bearing components for very demanding applications where successful operation at high temperature is a must. Examples are aero-engine bearings and turbocharger bearings.

The process for the manufacture of the steel for the bearing component avoids rapid cooling so that residual stresses can be avoided in large component pieces.

The bearing component alloy according to the present invention is preferably processed via a powder metallurgy route. In this connection, the presence of aluminium in the alloy is kept to a minimum and preferable at a trace level. The powder metallurgy process route, when combined with a relatively high austenitisation temperature (about 860 to 1100° C., typically approximately 880° C.), and without aluminium in the bulk composition, allows for a higher vanadium carbide content in the structure, together with a wide enough austenite+vanadium carbide phase field at the desired temperature. The higher vanadium content in the bulk, along with appreciable increase in the alloy content of carbon translates into a greater number of vanadium-rich precipitates thereby improving strength and hardness.

The alloy composition as herein described is designed to be austenetised at about 860 to about 1100° C. (more typically about 870 to about 1080° C.). This heat-treatment, in combination with the alloy chemistry, provides the following advantages. The alloy is in the austenite+vanadium-rich carbides phase field, thereby only the phases of interest are retained. The austenite has a composition (at equilibrium with the vanadium precipitates) that allows it to retain hardenability. The austenite has a composition that enables it to transform into a very fine, nano-structured, carbide-free bainitic matrix.

If desired, various mechanical properties can be improved by carrying out any of the conventional post-bainite transformation steps. For example, in some cases, the yield strength can be improved by carrying out a post-bainite transformation deformation step followed by tempering.

The bearing component may be part of a rolling element bearing, for example the bearing inner or outer ring, or the ball or roller element. The bearing component could also be part of a linear bearing such as ball and roller screws.

The present invention also provides a bearing comprising a bearing component as herein described.

BRIEF DESCRIPTION OF THE DRAWINGS

The present invention will now be further described with reference to the following non-limiting Figures in which.

EXAMPLES

The present invention will now be further described with reference to the following non-limiting Examples.

Example 1

An example of a suitable bainitic steel composition for use in the present invention includes (the balance being Fe and any unavoidable impurities):

2.45 wt. % carbon,
1.5 wt. % silicon,
1.7 wt. % manganese,
1.7 wt. % chromium,
1.4 wt. % cobalt, and
7.6 wt. % vanadium.

Shown below is a thermodynamic calculation, at equilibrium, demonstrating the composition of the austenitic matrix phase at 1080° C.:

---

Conditions:

T = 1353.15, N = 1, P = 1E5, W(C) = 2.45E−2, W(MN) = 1.7E−2, W(SI) = 1.5E−2, W(CR) = 1.7E−2, W(CO) = 1.4E−2, W(V) = 7.6E−2
DEGREES OF FREEDOM 0
Temperature 1353.15 K (1080.00 C), Pressure 1.000000E+05
Number of moles of components 1.00000E+00, Mass in grams 5.02055E+01
Total Gibbs energy −7.74529E+04, Enthalpy 2.81541E+04, Volume 5.77499E−06

| Component | Moles | W-Fraction | Activity | Potential | Ref. stat |
|---|---|---|---|---|---|
| C  | 1.0241E−01 | 2.4500E−02 | 4.8940E−02 | −3.3945E+04 | SER |
| CO | 1.1927E−02 | 1.4000E−02 | 2.2682E−05 | −1.2031E+05 | SER |
| CR | 1.6415E−02 | 1.7000E−02 | 8.3701E−05 | −1.0563E+05 | SER |
| FE | 7.5200E−01 | 8.3650E−01 | 1.9376E−03 | −7.0276E+04 | SER |
| MN | 1.5536E−02 | 1.7000E−02 | 1.2104E−05 | −1.2738E+05 | SER |
| SI | 2.6814E−02 | 1.5000E−02 | 1.2400E−07 | −1.7892E+05 | SER |
| V  | 7.4902E−02 | 7.6000E−02 | 1.7230E−06 | −1.4931E+05 | SER |

FCC_A1#1 Status ENTERED Driving force 0.0000E+00
Moles 8.4565E−01, Mass 4.5150E+01, Volume fraction 9.9545E−01 Mass fractions:

FE  9.28077E−01  SI  1.66797E−02  CR  1.06944E−02  V  2.23794E−03
MN  1.88144E−02  CO  1.55443E−02  C   7.95206E−03
FCC_A1#2 Status ENTERED Driving force 0.0000E+00
Moles 1.5435E−01, Mass 5.0559E+00, Volume fraction 4.5531E−03 Mass fractions:

V  7.34703E−01  CR  7.33096E−02  MN  7.97272E−04  SI  1.07181E−07
C  1.72275E−01  FE  1.87062E−02  CO  2.08912E−04

---

Example 2

A steel alloy powder was prepared having the following chemical composition:
2.4 wt. % carbon,
1.42 wt. % silicon,
1.74 wt. % manganese,
1.9 wt. % chromium,
1.31 wt. % cobalt, and
7.53 wt. % vanadium,
the balance being iron and any unavoidable impurities (including trace amounts of phosphorus and sulphur).

Figure 1:
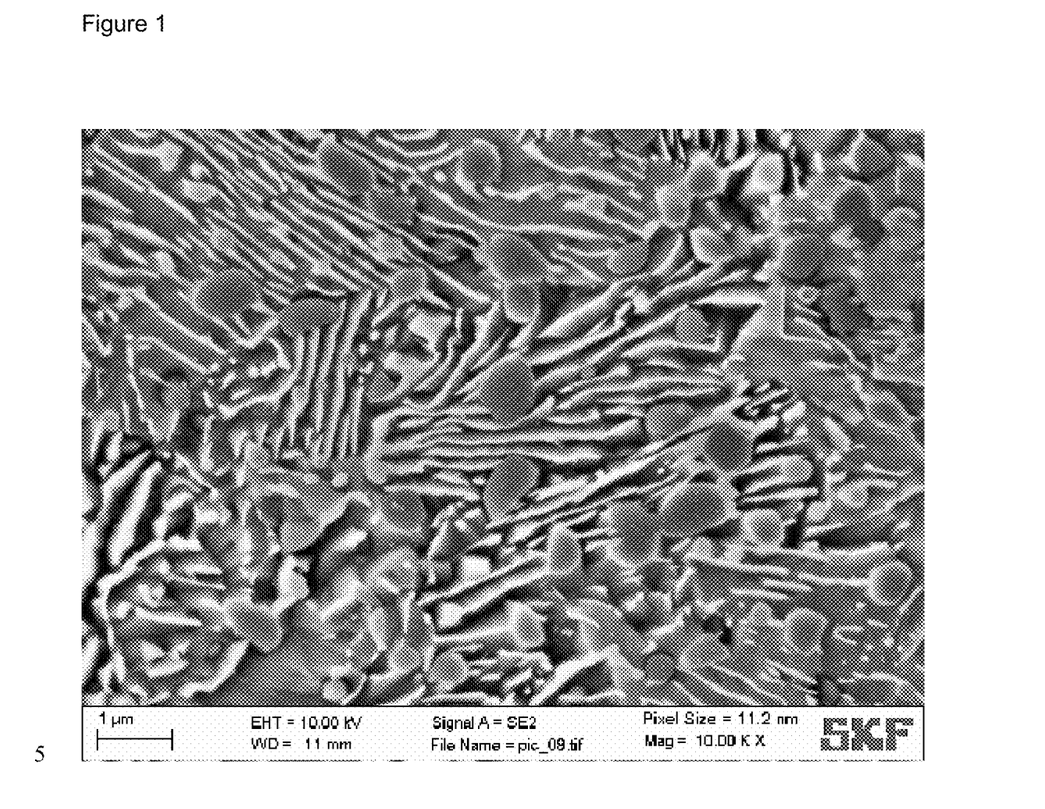
FIG. 1 shows a scanning electron microscope image of a steel alloy for use in the present invention after hot isostatic pressing (HIP).

Hot isostatic pressing (HIP) was carried out on the steel alloy powder. FIG. 1 shows a scanning electron microscope image of the steel alloy after HIP (EHT=10.00 kV, Signal A=SE2, Pixel Size=11.2 nm, WD=11 mm, Mag=10.00 k X). The microstructure can be seen to comprise a pearlitic matrix with vanadium carbides.

Figure 2:
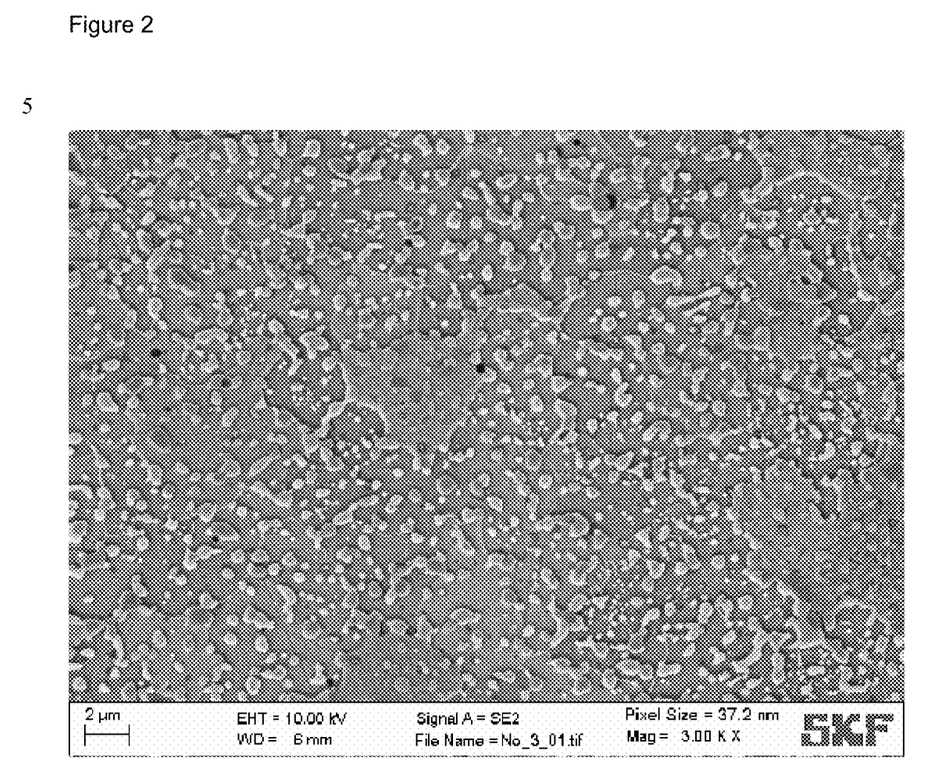
FIG. 2 shows a scanning electron microscope image of a steel alloy for use in the present invention after spheroidise-annealing heat treatment.

A spheroidise-annealing heat treatment was then carried out on the steel alloy, which involved heating the alloy to approximately 800° C., holding at that temperature for approximately 60 minutes, and then slowly cooling to room temperature. This heat treatment may enhance the machinability of the material as well as provide a structure that has a better response to hardening. FIG. 2 shows a scanning electron microscope image of the steel alloy after spheroidise-annealing (EHT=10.00 kV, Signal A=SE2, Pixel Size=37.2 nm, WD=6 mm, Mag=3.00 k X). The microstructure can be seen to comprise numerous fine, small iron carbides and vanadium carbides embedded in a soft ferritic matrix.

Martensitic Hardening

Figure 3:
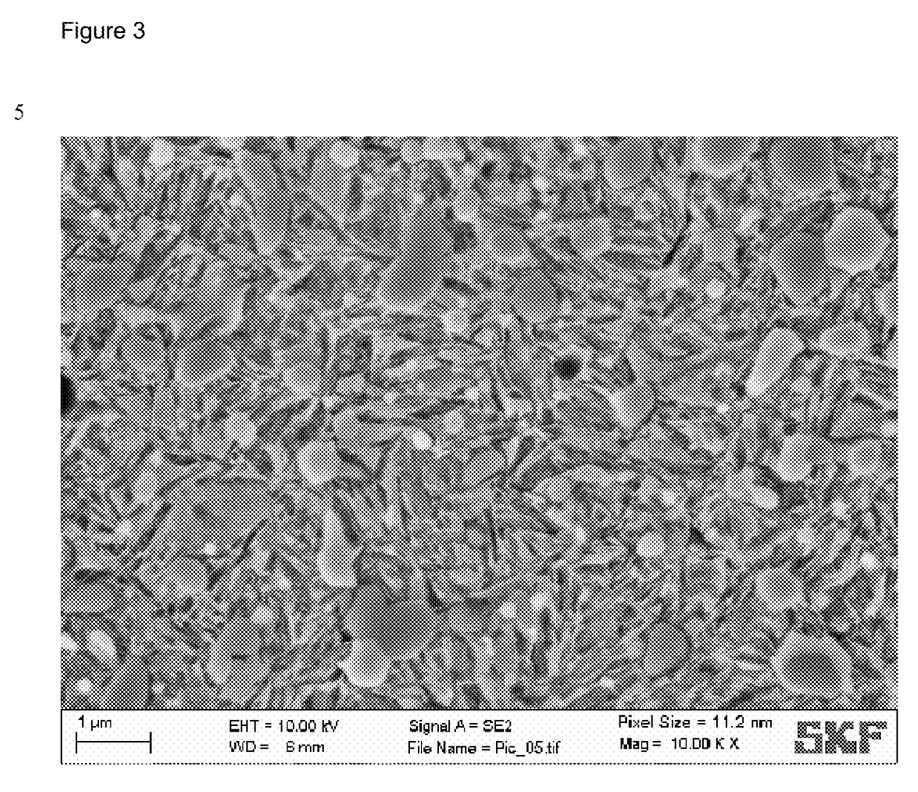
FIG. 3 shows a scanning electron microscope image of a steel alloy for use in the present invention after martensitic tempering heat treatment.

From the as-annealed condition, a martensitic tempering heat treatment was then carried out on the steel alloy. During the heat treatment the steel alloy was quenched from approximately 880° C. to approximately 60° C. and then held at that temperature for approximately 15 minutes. A first specimen of the steel alloy was then further quenched into cold water kept at approximately 15° C. The first specimen was held in the water for approximately 10 minutes and then immediately tempered at approximately 160° C. for approximately 90 minutes. Following tempering, the steel alloy was air-cooled to room temperature. FIG. 3 shows a scanning electron microscope image of the steel alloy after the heat treatment (EHT=10.00 kV, Signal A=SE2, Pixel Size=11.2 nm, WD=6 mm, Mag=10.00 k X). The microstructure can be seen to comprise numerous, relatively small iron carbides and vanadium carbides in a tempered martensite matrix.

Hardness measurements were carried out on the heat-treated steel alloy and indicated a hardness of 870 HV10, which corresponds to about 65.3 HRC. It was found that if sub-zero treatment is combined with the above heat treatment, the hardness could be increased by 1 to 2 HRC more.

Instead of further quenching the steel alloy in cold water for 10 minutes, as occurred with the first specimen, it is also possible to further quench the steel alloy in liquid nitrogen. A second specimen of the steel alloy was further quenched in liquid nitrogen and kept in that medium for 10 minutes, then tempered as described above. After tempering, the second specimen exhibited a hardness of approximately 911 HV10, which corresponds to about 66.6 HRC. This improvement of hardness, and accordingly strength, is possibly attributable to the reduction of the austenite content in the final hardened and tempered structure. It is anticipated that by increasing the temperature at which the steel is austenitised, but not exceeding the limits stated herein, the resulting hardness can be increased further.

A third specimen of the steel alloy was also quenched from approximately 880° C. to approximately 60° C. and then held at that temperature for approximately 15 minutes followed by further quenching into cold water kept at approximately 15° C. The third specimen was held in the water for approximately 10 minutes and then immediately tempered at approximately 500° C. for approximately 60 minutes. Following tempering, the steel alloy was air-cooled to room temperature. The measured hardness was 647 HV10, which corresponds to approximately 56.6 HRC.

A fourth specimen of the steel alloy was quenched from approximately 920° C. to approximately 60° C. and then held at that temperature for approximately 15 minutes, followed by further quenching into liquid nitrogen. The fourth specimen was held in liquid nitrogen for approximately 10 minutes and then immediately tempered at approximately 550° C. for approximately 60 minutes. Following tempering, the steel alloy was air-cooled to room temperature. The measured hardness was 611 HV10, which corresponds to approximately 54.7 HRC.

It can therefore be concluded that the alloy structure holds its hardness well when tempered at relatively high temperatures, allowing the inventive steel alloy to be used to be used in high temperature bearing applications.

Bainitic Hardening

Figure 4:
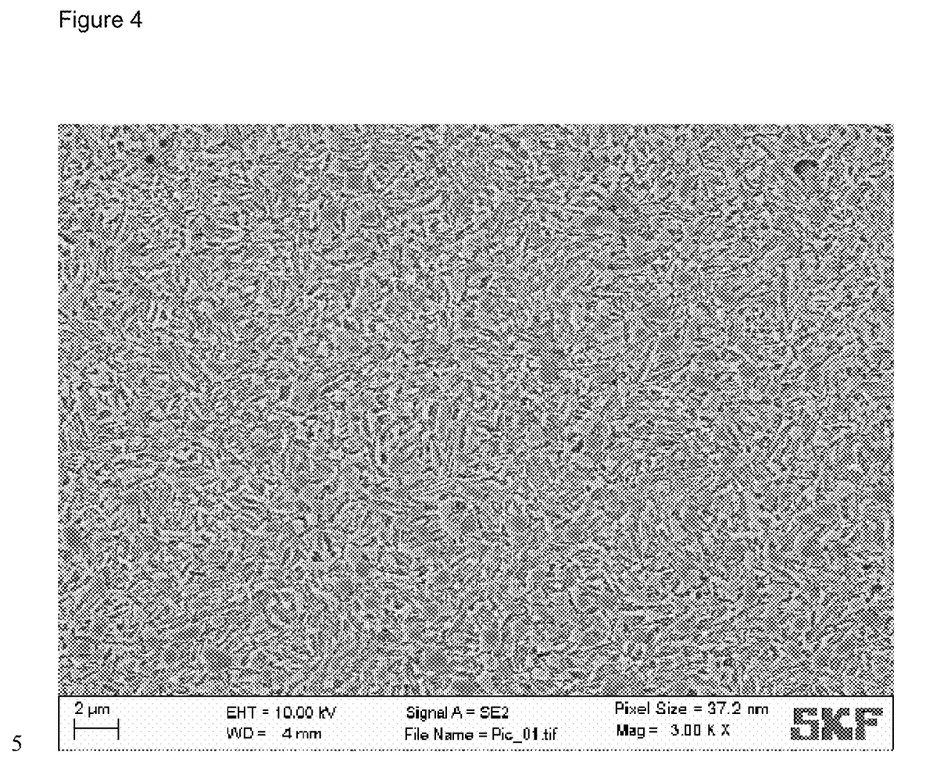
FIG. 4 shows a scanning electron microscope image of a steel alloy for use in the present invention after bainitic heat treatment.

From the as-annealed condition, a bainitic austempering heat treatment was carried out on a fifth specimen of the steel alloy. During this heat treatment the steel alloy was quenched from approximately 880° C. to approximately 250° C. and then held at that temperature for 18 hours. Afterwards, the steel alloy was air-cooled to room temperature. FIG. 4 shows a scanning electron microscope image of the steel alloy after the bainitic heat treatment (EHT=10.00 kV, Signal A=SE2, Pixel Size=37.2 nm, WD=4 mm, Mag=3.00 k X). The microstructure can be seen to comprise numerous, relatively small iron carbides and vanadium carbides in a very fine bainitic matrix that is comprising bainitic ferrite with thin austenite films. Some quite small austenite blocks could also be observed.

For comparison, a reference steel alloy (Alloy 3 in: C. Garcia-Mateo et al., ISIJ International, Vol. 43 (2003), No. 11, pp. 1821-1825) was also bainitically hardened in exactly the same way as the fifth specimen of the inventive steel alloy presented herein. Hardness measurements were carried out on both steels. The reference steel had a hardness of 585 HV10 (approximately 53.4 HRC) compared with 662 HV10 (approximately 57.3 HRC) for the fifth specimen.

This represents a significant improvement of the hardness of such bainitic steels, and the shown examples demonstrate the versatility of the inventive steel presented herein.

Moreover, it is expected that the hardness will improve further by transforming into bainite at lower temperatures, albeit with longer holding times.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A bearing component formed from a steel composition comprising:
   1.8-2.8 wt. % carbon,
   1.0-2.0 wt. % silicon,
   1.0-2.5 wt. % manganese,
   1.0-2.5 wt. % chromium,
   1.0-2.0 wt. % cobalt,
   5.0-11.0 wt. % vanadium,
      0-0.1 wt. % sulphur,
      0-0.1 wt. % phosphorous,
      0-1.35 wt. % molybdenum,
      0-0.5 wt. % aluminium,
      0-0.075 wt. % arsenic,
      0-0.075 wt. % tin, and
      0-0.075 wt. % antimony,
   the balance being iron and unavoidable impurities.

2. The bearing component as claimed in claim 1, comprising 1.2-2.0 wt. % silicon.

3. The bearing component as claimed in claim 1, comprising 1.2-2.5 wt. % manganese.

4. The bearing component as claimed in claim 1, comprising 1.0-1.8 wt. % chromium.

5. The bearing component as claimed in claim 1, comprising 6.5-11.0 wt. % vanadium.

6. The bearing component as claimed in claim 1, comprising 2.2 to 2.5 wt. % carbon.

7. The bearing component as claimed in claim 1, comprising 1.4-1.6 wt. % silicon.

8. The bearing component as claimed in claim 1, comprising 1.6-1.8 wt. % manganese.

9. The bearing component as claimed in claim 1, comprising 1.6-1.8 wt. % chromium.

10. The bearing component as claimed in claim 1, comprising 11.3-1.5 wt. % cobalt.

11. The bearing component as claimed in claim 1, comprising 7.0-8.0 wt. % vanadium.

12. The bearing component as claimed in claim 1, wherein the microstructure of the steel composition comprises bainite and/or martensite.

13. The bearing component as claimed in claim 1, wherein the microstructure of the steel composition comprises vanadium carbide precipitates.

14. The bearing component as claimed in claim 1, wherein the microstructure of the steel composition comprises plates of bainite of less than 100 nm thickness.

15. The bearing component as claimed in claim 1, wherein the microstructure of the steel composition comprises plates of bainite interspersed with austenite films.

16. The bearing component as claimed in claim 1, wherein the bearing component is formed as one of a rolling element, an inner ring, or an outer ring.

17. The bearing component as claimed in claim 1, comprising:
   1.2-1.8 wt. % silicon,
   1.2-2.3 wt. % manganese, and
   6.5-9.0 wt. % vanadium.

18. The bearing component as claimed in claim 1, wherein the steel composition has a microstructure composed of at least 60 vol. % bainite.

19. A bearing component formed from a steel composition consisting of:
   1.8-2.8 wt. % carbon,
   1.0-2.0 wt. % silicon,
   1.0-2.5 wt. % manganese,
   1.0-2.5 wt. % chromium,
   1.0-2.0 wt. % cobalt, 5.0-11.0 wt. % vanadium, and
0-0.1 wt. % sulphur,
0-0.1 wt. % phosphorous,
0-1.35 wt. % molybdenum,
0-0.5 wt. % aluminium,
0-0.075 wt. % arsenic,
0-0.075 wt. % tin,
0-0.075 wt. % antimony, the balance being iron and unavoidable impurities.

20. The bearing component as claimed in claim 19, wherein the steel composition has a microstructure composed of at least 60 vol. % bainite and the bainite is composed of plates having a thickness of less 100 nm.

* * * * *